United States Patent
Marcon

(10) Patent No.: US 7,996,318 B2
(45) Date of Patent: Aug. 9, 2011

(54) MULTI-FUNCTION ELECTRONIC TRANSACTION CARD

(76) Inventor: Robert Victor Marcon, Niagara Falls (CA)

(*) Notice: Subject to any disclaimer, the term of this patent is extended or adjusted under 35 U.S.C. 154(b) by 2984 days.

(21) Appl. No.: 10/266,660

(22) Filed: Oct. 8, 2002

(65) Prior Publication Data

US 2003/0069846 A1 Apr. 10, 2003

Related U.S. Application Data

(60) Provisional application No. 60/327,850, filed on Oct. 9, 2001.

(51) Int. Cl.
*G06F 21/00* (2006.01)
(52) U.S. Cl. ............ 705/50; 705/54; 705/64
(58) Field of Classification Search .......... 705/41, 705/50
See application file for complete search history.

(56) References Cited

U.S. PATENT DOCUMENTS

| | | | |
|---|---|---|---|
| 3,376,661 A | 4/1968 | Hulett | |
| 3,512,130 A | 5/1970 | Hulett | |
| 3,855,033 A * | 12/1974 | Staats | 156/220 |
| 4,443,027 A | 4/1984 | McNeely et al. | |
| 4,593,936 A | 6/1986 | Opel | |
| 4,634,848 A | 1/1987 | Shinohara et al. | |
| 4,764,300 A | 8/1988 | Hibst et al. | |
| 4,827,425 A | 5/1989 | Linden | |
| 5,016,919 A * | 5/1991 | Rotondo | 283/82 |
| 5,073,221 A | 12/1991 | Waitts et al. | |
| 5,466,918 A | 11/1995 | Ray et al. | |
| 5,477,040 A | 12/1995 | Lalonde | |
| 5,491,326 A * | 2/1996 | Marceau et al. | 235/381 |
| 5,605,753 A | 2/1997 | Sanada et al. | |
| 5,698,284 A | 12/1997 | Kubota et al. | |
| 5,844,230 A | 12/1998 | Lalonde | |
| 5,883,377 A | 3/1999 | Chapin, Jr. | |
| 5,984,191 A | 11/1999 | Chapin, Jr. | |
| 5,999,624 A * | 12/1999 | Hopkins | 705/70 |
| 6,138,917 A | 10/2000 | Chapin, Jr. | |
| 6,234,902 B1 * | 5/2001 | Hazama | 463/43 |
| D443,298 S | 6/2001 | Webb et al. | |
| 6,248,199 B1 | 6/2001 | Smulson | |
| 6,251,474 B1 | 6/2001 | Hong et al. | |
| 6,601,769 B2 | 8/2003 | Barnhill et al. | |

FOREIGN PATENT DOCUMENTS

| | | |
|---|---|---|
| EP | 266926 A2 | 5/1988 |
| WO | WO 97/19421 | 5/1997 |

* cited by examiner

*Primary Examiner* — Andrew J. Fischer
*Assistant Examiner* — Chrystina Zelaskiewicz
(74) *Attorney, Agent, or Firm* — James C. Simmons

(57) ABSTRACT

The present invention provides for a multi-function electronic transaction card or MET card, which comprises a base card and at least two conventional magnetic stripes. As such, they can be used in either proprietary or syndicated applications employing credit, debit, cash, and borrowing, as well as, information storage, single and co-branding programs, award points, loyalty programs, affinity programs, personal identification, licenses, and electronic keys. MET cards can also be used to reduce soliciting, issuing, delivering, confirmation, monitoring, and billing costs. The incidence of criminal theft and unauthorized use is also significantly decreased as is the overall quantity of environmental waste generated. Where required, MET cards may also utilize one or more electronic chips and/or radio frequency identification tags in order to further enhance functionality. As a result, MET cards offer a level of performance and versatility that is reliable, innovative, and highly marketable.

9 Claims, 6 Drawing Sheets

MULTI-FUNCTION ELECTRONIC TRANSACTION CARD

CROSS-REFERENCES

This application claims priority from U.S.A. Provisional Application Ser. No. 60/327,850, filed 9 Oct. 2001.

FEDERALLY SPONSORED RESEARCH OR DEVELOPMENT STATEMENTS

Not Applicable.

REFERENCE TO MICROFICHE APPENDIXES

Not Applicable.

BACKGROUND OF THE INVENTION

This invention relates to electronic transaction cards. More particularly, it relates to electronic transaction cards which utilize at least two conventional magnetic stripes and which may also be used in various applications such as credit, debit, cash, and borrowing, as well as, information storage, single and co-branding programs, awards points, loyalty programs, affinity programs, personal identification, licenses, and electronic keys.

In the past as well as the present, credit, debit, and other magnetic stripe cards, have used only one magnetic stripe. Although unchanged for decades, these designs did provide an acceptable level of performance in line with traditional business practices. Current business environments, however, have now evolved to such a high degree of diversity and competition that many people regularly carry large numbers of these cards with them. Unfortunately, this has lead to a situation with many problems, most of which can be directly attributed to the inherent design inadequacies of these single stripe cards. For instance, the soliciting, issuance, delivering, confirmation, monitoring, and billing of such a large number of cards is very expensive and environmentally wasteful. Moreover, as the quantity of cards increases so does the possibility of loss and theft. Add to this, the needless cluttering of consumer wallets and the increased environmental waste caused by prodigious quantities of discarded and expired cards, it becomes quite clear, that these various design weaknesses are innate.

Therefore, in order to alleviate these problems and others a number of business groups developed what are now called, smart cards. Although much more expensive than traditional single stripe cards, smart cards could, by virtue of the electronic chips embedded within them, simultaneously replace many of these other cards. They could also greatly expand individual card capabilities as well as increase their functionality. Thus, in spite of their exorbitant price, general market acceptance seemed assured as demand began to grow. However, two major barriers inevitably impeded these initial successes. The first of these was high cost. The second, but more important, was the realization that almost all of the equipment currently used by financial institutions, retailers, vendors, and others was magnetic stripe based.

Consequently, the only way that smart card advocates could overcome such limitations would be to persuade existing businesses to upgrade their operations. Such an undertaking, however, will no doubt prove to be both arduous and expensive because it will require the upgrading of all central mainframe computers, the retrofitting of millions of point of sale units, the purchasing of new support equipment, the training of personnel, and the ongoing maintenance and upkeep of two independent transaction systems. As a result, these companies have, for the most part, delayed or deferred any major market introduction within their North American operations.

In an effort to resolve these new problems, some smart card manufactures have now incorporated a single magnetic stripe into their new card designs. The reasoning was that by possessing both an electronic chip and a magnetic stripe all problems could now be overcome. However, while the theory was good the reality was not. That was because this remedy did not effectively overcome many of the previous failings. For example, by utilizing such a design combination the already high fabrication cost of smart cards was made costlier still. Secondly, should the security features of smart cards ever be defeated by criminals or other non-authorized users the ramifications would be most severe. That is because it would allow such people unfettered access to information much more sensitive than that found in any contemporary magnetic stripe. Lastly, and most importantly, the ongoing operational expenses of a hybrid card system is both costly and burdensome, because it would require financial institutions and vendors alike, to keep two individually unique technological systems operational, where only one existed before.

With these thoughts in mind, it becomes increasingly clear that a number of pressing needs remain unfulfilled in this area of business. To this end, the invention disclosed herein addresses these deficiencies by providing a more effective solution for an optimal overall performance and business model.

OBJECTS AND ADVANTAGES

The new multi-function electronic transaction card or MET card disclosed herein overcomes many of the drawbacks listed in the prior art by providing among other things, an increase in functionality, reliability, and marketability, as well as, reductions in cost, size, and environmental waste. In addition, some of the objects and advantages associated with this invention are also described below. Others will become apparent as the description proceeds.

Objects (1) To create various multi-function electronic transaction cards which possess at least two magnetic stripes.
(2) To extend the life of current magnetic stripe technology by increasing its usefulness.
(3) To lower the overall operational costs associated with current magnetic stripe card technology.
(4) To reduce the overall bulk, carrying weight, and environmental impact of single stripe cards by minimizing their overall numbers.
(5) To create various hybrid multi-function electric transaction cards which contain at least two magnetic stripes and at least one electronic chip and/or radio frequency identification tag.

Advantages (1) MET cards allow financial institutions, as well as other business entities, to offer a much larger array of services on one card. This significantly increases both customer convenience and business opportunities.
(2) The solicitation, issuing, delivering, confirmation, monitoring, and billing of conventional single stripe cards is very expensive. Consequently, when a single MET card can be used to replace a number of single stripe cards, costs are greatly reduced.

(3) Since MET cards are easily able to incorporate many different payment options into a single card, the need for checks, as a means of payment, should decrease substantially. In turn, this will not only reduce the cardholder's costs but the retailer's and issuer's as well.

(4) MET cards are easily able to provide a large number of multi-currency options specifically tailored to the individual needs of cardholders, issuers or retailers.

(5) Since any MET card design allows for at least two magnetic stripes, MET cards can be syndicated. This, therefore, allows more than one institution, company, or other business entity to be simultaneously represented on a single card, thereby dramatically lowering initial capital requirements as well as ongoing operational expenses.

(6) When MET cards are used to replace a number of conventional single stripe cards, the reduction in both bulk and weight is considerable.

(7) When a number of conventional single stripe cards are replaced with a single MET card better security features can be employed affordably. This offers both issuers and consumers alike, a higher level of protection from unauthorized or criminal use.

(8) By decreasing the overall quantity of single stripe cards, MET cards are able to significantly lower the incidence of both accidental loss and criminal theft.

(9) Worldwide, millions of single stripe cards are discarded yearly creating unnecessarily large quantities of environmental waste. By using MET cards, this tally could be dramatically reduced thereby benefiting the environment accordingly.

(10) By identically encoding at least one magnetic stripe, electronic chip or radio frequency identification tag on the same card, MET cards are able to provide immediate backup capabilities. This, therefore, not only provides a convenience currently unavailable in any other conventional card but substantially increases both reliability and dependability as well.

(11) By using at least two magnetic stripes, MET cards are able to offer performance levels unmatched by any other conventional single stripe card. As a result, the marketing and competitive potential of MET cards is not only superior but timely as well.

SUMMARY OF THE INVENTION

The invention herein described provides for a multi-function electronic transaction card or MET card which contains a base card and at least two conventional magnetic stripes. Moreover, these stripes can be individually programmed in order to perform various financial, information or hardware functions that may include, but are not limited to, credit, debit, cash, and borrowing, as well as, information storage, single and co-branding programs, awards points, loyalty programs, affinity programs, personal identification, licenses, and electronic keys.

MET card designs may also make use of various features. These may include, but are not limited to, one or more account numbers, dotted account numbers, unidentified account numbers, authorized users, effective dates, expiry dates, signature strips, full shielding foils, local shielding foils, card holes, color code matchings, feature embossings, dedicated feature imagings, ghostings, issuer names, issuer codes, bar codes, serial numbers, logos, emblems, artworks, advertisings, holographs, identification pictures, passwords, personal identification numbers (PINs), identification numbers, personal information, biometric information, finger prints, retinal prints, facial prints, facial information, instructions, telephone numbers, addresses, and internet addresses, alone or in combination.

In addition, MET cards are also able to substantially reduce overall operational costs, especially those associated with solicitation, issuing, delivering, confirmation, monitoring, and billing. MET cards are also easily able to provide a large number of multi-currency options specifically tailored to the individual needs of cardholders, issuers or retailers. Their ability to provide immediate backup capabilities is also a characteristic of significant importance and a feature currently unavailable in any other card. Yet another beneficial aspect of MET cards is that their increased usage diminishes both unauthorized and criminal use as well as the total tally of environmental waste.

If the need should arise, MET card capabilities may yet be increased by including or incorporating at least one electronic chip and/or radio frequency identification tag into their design so as to thereby create a hybrid multi-function electronic transaction card or HYMET card. Although substantially more expensive than other less sophisticated MET cards, HYMET cards can offer all parties a performance and versatility unrivalled by any present day card, be it a magnetic stripe, electronic chip or hybrid design.

Yet another important design advantage of MET cards is that they can be easily syndicated. In this way, the rights to individual magnetic stripes, electronic chips or radio frequency identification tags can be assigned, sold, rented or leased, in whole or in part, to various diverse institutions or companies. In turn, this can dramatically lower both initial and ongoing operational costs as well as provide an increased physical presence in an overall greater number of cards.

In conclusion therefore, MET cards offer both issuer and user alike, a number of favourable and highly desirable benefits not found in any contemporary single stripe or smart card design.

BRIEF DESCRIPTION OF THE DRAWINGS

The invention disclosed herein will best be understood when the following detailed text is read in conjunction with the accompanying drawings wherein.

LIST OF THE REFERENCE NUMERALS USED IN THE DRAWINGS

Figure 1:
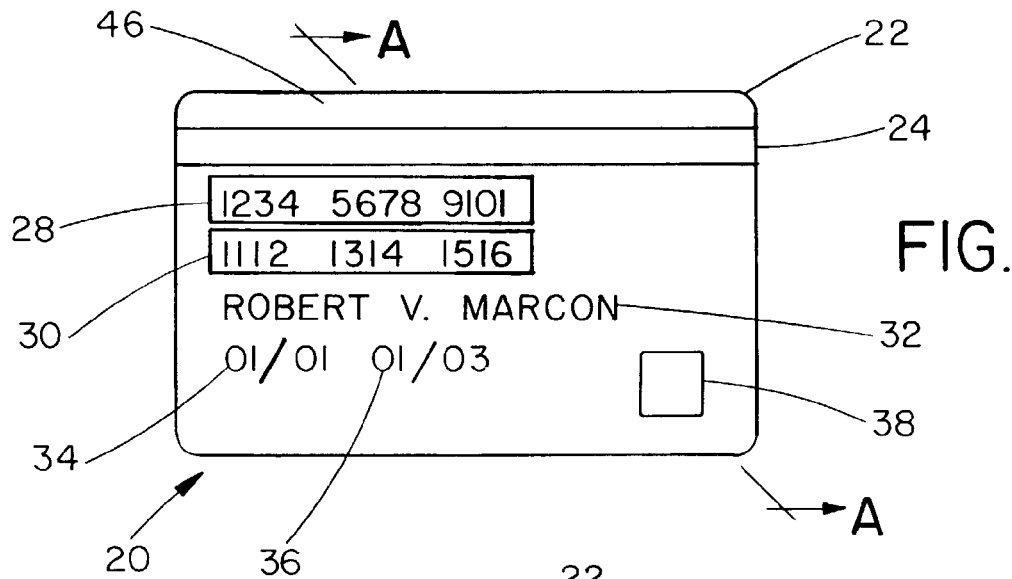
FIG. 1: is a pictorial representation of the front side of a basic multi-function electronic transaction card or BMET card comprising two magnetic stripes as well as various other features.

Note: throughout this disclosure like numbered reference numerals refer to similar features, components or assemblies.

20. Basic multi-function electronic transaction card or BMET card.
22. Base card.
24. First magnetic stripe.
26. Second magnetic stripe.
28. First account number.
30. Second account number.
32. Authorized user.
34. Effective date.
36. Expiry date.
38. Holograph.
40. Signature strip.
42. Full shielding foil.
44. Local shielding foil.
46. First magnetic stripe edge.
48. Second magnetic stripe edge.
50. Basic multi-function electronic transaction card or BMET card.
52. Base card.
54. First magnetic stripe.
56. Second magnetic stripe.
58. Embossed first account number.
60. Embossed second account number.
62. Embossed first authorized user.
64. Embossed second authorized user.
66. Embossed first effective date.
68. Embossed second effective date.
70. Embossed first expiry date.
72. Embossed second expiry date.
74. Signature strip.
76. Basic multi-function electronic transaction card or BMET card.
78. Base card.
80. First magnetic stripe.
82. Second magnetic stripe.
84. Embossed first account number.
86. Embossed second account number.
88. Embossed first authorized user.
90. Embossed second authorized user.
92. Embossed first effective date.
94. Embossed second effective date.
96. Embossed first expiry date.
98. Embossed second expiry date.
100. First signature strip.
102. Second signature strip.
104. Intermediate multi-function electronic transaction card or IMET card.
106. Base card.
108. First magnetic stripe.
110. Second magnetic stripe.
112. Third magnetic stripe.
114. Dotted and embossed first account number.
116. Dotted and embossed second account number.
118. Dotted and embossed third account number.
120. Embossed authorized user.
122. Embossed effective date.
124. Embossed expiry date.
126. Holograph.
128. Signature strip.
130. Advanced multi-function electronic transaction card or AMET card.
132. Base card.
134. First magnetic stripe.
136. Second magnetic stripe.
138. Third magnetic stripe.
140. Fourth magnetic stripe.
142. Embossed first account number.
144. Second account number.
146. Embossed first authorized user.
148. Second authorized user.
150. Third authorized user.
152. Embossed effective date.
154. Embossed expiry date.
156. Holograph.
158. Signature strip.
160. Enhanced multi-function electronic transaction card or EMET card.
162. Base card.
164. First outer magnetic stripe.
166. First inner magnetic stripe.
168. Second inner magnetic stripe.
170. Second outer magnetic stripe.

DETAILED DESCRIPTION OF THE INVENTION

Generically speaking, a multi-function electronic transaction card, also known herein as a MET card, may be designed in a number of different ways. Unlike conventional magnetic stripe cards (not shown) which possesses a base card and only one magnetic stripe, MET cards possess a base card and at least two magnetic stripes. This, in turn, permits the issuer to not only offer a much larger array of business functions but achieve higher operational efficiencies as well. As a result, MET cards may be used in a number of different card applications, which may include but are not limited to, credit, debit, cash, borrowing, loan, secured and unsecured lines of credit, information storage, single and co-branding programs, awards points, loyalty programs, affinity programs, security, personal identification, licenses, electronic passes, and electronic keys, alone or in combination.

As such, it is to this end that the following description is therefore provided, to enable any person skilled in the art to make and use the invention herein disclosed. Various modifications, however, will remain readily apparent to those skilled in the art, as the generic principles of the present invention have been defined herein specifically to provide for the description of a multi-function electronic transaction card or MET card.

With these thoughts in mind, the disclosure will now begin with a variety of general information applicable to all MET cards. It will then detail various MET card designs beginning with the least complex. Finally, the disclosure will conclude by documenting various multi-currency options, MET card syndication, followed by closing arguments, and references.

General Information

All MET base cards, magnetic stripes, electronic chips, and other features described below may be made, fashioned or otherwise constructed from materials and techniques which are customarily used in the production of conventional magnetic stripe and smart card products. Such smart card products shall also encompass all possible design variations, including both contact and non-contact designs, models or types, as well as any features, components or parts therein.

Moreover, MET card designs may also encompass, incorporate or comprise many different layouts and features. Such designs may therefore include, but are not limited to, basic, intermediate, advanced, enhanced as well as hybrid designs, all of which are also, readily compatible with current banking and retailing equipment.

MET card features, on the other hand, may include but are not limited to, one or more account numbers, dotted account numbers, unidentified account numbers, authorized users, effective dates, expiry dates, signature strips, full shielding foils, local shielding foils, card holes for carrying or hanging MET cards, color code matchings, feature embossings, dedicated feature imagings, ghostings, issuer names, issuer codes, bar codes, serial numbers, logos, emblems, artworks, advertisings, holographs, identification pictures, passwords, personal identification numbers (PINs), identification numbers, personal information, biometric information, finger prints, instructions, telephone numbers, addresses, and internet addresses, alone or in combination. These various features will therefore allow, all MET cards to be much more easily and precisely customized for their intended tasks, thereby facilitating greater market acceptance and thus, use.

However, it should also be understood, that the features detailed above are not allocated or relegated to any one specific MET card or design. Rather, they are applicable to any card or design as need, convenience or layout may dictate.

In addition to the above, color code matching shall for the purposes of this disclosure, refer to the matching, linking or correlating, by color or design, of various individual magnetic stripes and or electronic chips to one or more of the above named features. This can be done by simply coloring or patterning all or part of a magnetic stripe, electronic chip or abutting, neighbouring or adjacent area thereof, in a fashion similar to its affiliated or corresponding feature.

Moreover, embossing one or more features may also prove advantageous in certain circumstances. As such, feature embossing shall be herein referred to as any process or method used to raise a feature's surface in order to allow, as in conventional cards, these newly raised surfaces to easily mark, stamp or otherwise imprint their like image upon various papers, documents or receipts. If not specifically stated as an embossed surface a feature is to be considered flat. In any event, embossing helps to expedite most transactions with fewer mistakes thereby saving time as well as money.

In certain circumstances it may also be desirable to emboss only one side of a MET card but not the other so that this second surface will remain smooth and flat, and thus, free of any indentations or pits. Such cards can easily be constructed, using standard manufacturing techniques, by first affixing or attaching onto a MET card those features selected for the first side. Next, any first side feature that is to be embossed is embossed at this time. Once this is done, all second side features are now affixed or attached, but not embossed, to the other side in a similar manner. As a result, one side will possess various embossed features while the other will not.

Any MET card, magnetic stripe or electronic chip detailed within this disclosure may also utilize, if required, one or more authorized users whose authorizing or signatural powers may be selected from any one or a combination of limited, unlimited, or joint classifications. As such, anything herein considered to be jointly held or classified will require the endorsement or authorization of at least two authorized users for most purchases, transactions or other actions to be considered valid. This therefore, makes a joint authorizing system ideally suited to various financial applications which may include, but are not limited to, better expenditure control, and collective accountability, especially in families or organizations which have experienced overspending or bankruptcy problems. For purposes of information and not limitation, joint authorizing techniques such as these are also applicable to conventional single stripe, electronic chip, and hybrid cards as well.

In order to increase general overall security, MET cards may also make use of various passwords. These may include, but are not limited to, any series or sequence of numeric, alphabetical or alphanumeric digits as well as any singular or assorted pieces of biometric information such as finger prints, retinal prints, facial prints, facial information, voice prints, and the like. Note also, that the term "password", shall for the purpose of this disclosure also include the meanings and definitions normally associated with the phrase, "personal identification number or PIN".

Though passwords are in most cases concealed or otherwise kept secret, they may also be visually displayed in cards requiring minimal protection. They may also be relegated to providing blanket protection for an entire MET card as well as individually or independently dedicated to one or more magnetic stripes and or electronic chips. For instance, a MET card, regardless of the number of magnetic stripes and or electronic chips used, can be entirely protected by only one password. In other words, one password can be used to access all magnetic stripes and or electronic chips. Alternately, one password can also be used to individually access one or more but not all magnetic stripes and or electronic chips. Consequently, a two stripe MET card, such as a BMET card, would need two passwords in order to provide individual magnetic stripe protection. If this analogy or reasoning is extrapolated further, the reader is lead to one of the basic rules herein taught. That rule states, that a password, be it secret or publicly displayed, may be authorized, designated or used to protect, safeguard or otherwise govern, access to one or more magnetic stripes and or electronic chips, as required.

In other situations, there may be occasions where a magnetic stripe and or electronic chip needs more than one password in order to identify, record or limit, the purchases, money withdrawals or other activities relating to certain particular cardholders. As such, the use of at least one password for each and every authorized user will greatly expand the ability to track and control, at an individual level, each cardholder's activities. In turn, this will provide card issuers with a potent means of enforcing individual accountability as well as improving the overall accuracy of any consumer information gathered.

While MET cards have all been herein defined as possessing at least two magnetic stripes that does not mean that each stripe, or electronic chip for that matter, must be uniquely encoded. Rather, all magnetic stripes as well as electronic chips found in any MET card design can be utilized in any manner or fashion required. As a result, a MET card may therefore employ magnetic stripes and or electronic chips which are uniquely encoded and or identically encoded. In this way, the encoding of magnetic stripes and or electronic chips in an unique manner maximizes capacity, while encoding in an identical fashion, provides backup or auxiliary capabilities. For example, a MET card may have one, two or more of its magnetic stripes and or electronic chips identically encoded so as to provide immediate backup capabilities should the primary stripe or chip fail. By doing this, functionality may be reduced, but dependability, reliability, and durability is increased.

Basic Multi-Function Electronic Transaction Cards

Figure 2:
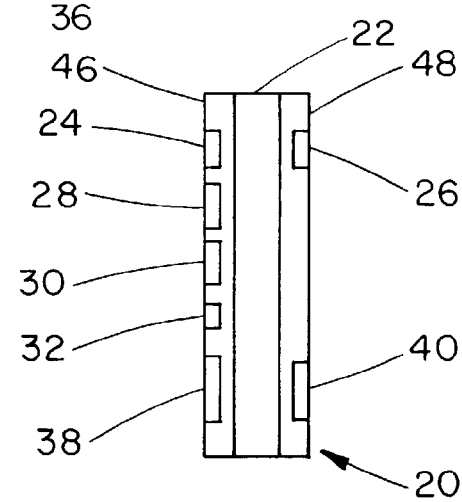
FIG. 2: is a pictorial representation of a sectional view taken substantially along line A-A in FIG. 1.
Figure 3:
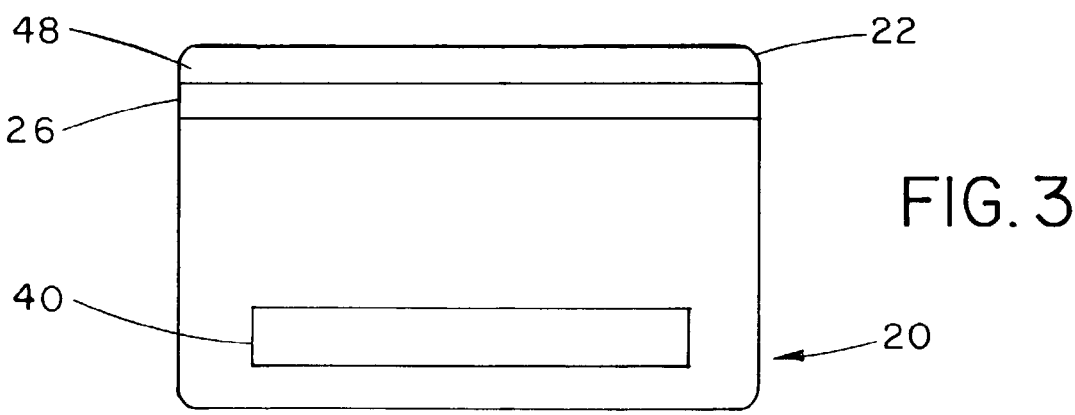
FIG. 3: is a pictorial representation of the back side of the BMET card shown in FIG. 1.
Figure 4:
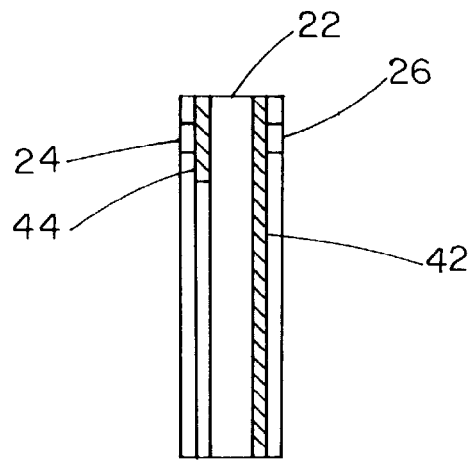
FIG. 4: is an alternate designed, sectional pictorial representation of the BMET card shown in FIG. 1 comprising only two magnetic stripes, a full shielding foil, and a local shielding foil.

Minimally speaking, a basic multi-function electronic transaction card, also known as a BMET card must possess a base card and two magnetic stripes. All other features utilized by such cards are to be considered optional as these items are only used when needed or when necessity dictates. Thus, by way of example and not limitation, FIGS. 1, 2, and 3 show various views of a BMET card 20. Here, card 20 is comprised of a base card 22 to which has been added, attached or affixed, by lamination or other conventional means, a first magnetic stripe 24, a second magnetic stripe 26, indicia including a first account number 28, a second account number 30, an authorized user 32, and effective date 34, an expiry date 36, a holograph 38, and a signature strip 40. Each of the magnetic stripes 24 and 26 as well as each of the other magnetic stripes discussed herein is electronically readable.

Where necessary, card 20 may also employ a full shielding foil 42, as seen in FIG. 4, in order to help prevent, during the encoding process, the corruption of magnetically stored information on stripes 24 and 26. Alternately, a local shielding foil 44, as seen in FIG. 4, can also be used to help protect stripes 24 and 26 from similar disruptions.

As is with many of the components detailed within this disclosure, shielding foils may be constructed from materials and techniques currently employed in various electrical and electronic industries. As such, shielding foils may be constructed from any singular or assortment of materials which may include, but are not limited to, various known magnetic barriers such as metal foils, electroplated metals, and combinations thereof. They may also be affixed, attached or otherwise fitted into position using a number of different methods, some of which include but are not limited to, conventional adhesives, electroplating techniques, and combinations thereof.

In order to further improve performance, BMET card 20 may also employ the technique of color code matching as seen here in FIGS. 1, 2, and 3. This can be effectuated by coloring or patterning a first magnetic stripe edge 46 in a fashion identical to first account number 28, and or coloring or patterning a second magnetic stripe edge 48 in a fashion identical to second account number 30. Thus, for example, edge 46 and account number 28 could be colored red whereas edge 48 and account number 30 could be colored blue. This technique will therefore allow the user to visually match each account number to its corresponding magnetic stripe in a quick, easy, and effective manner.

Figure 5:
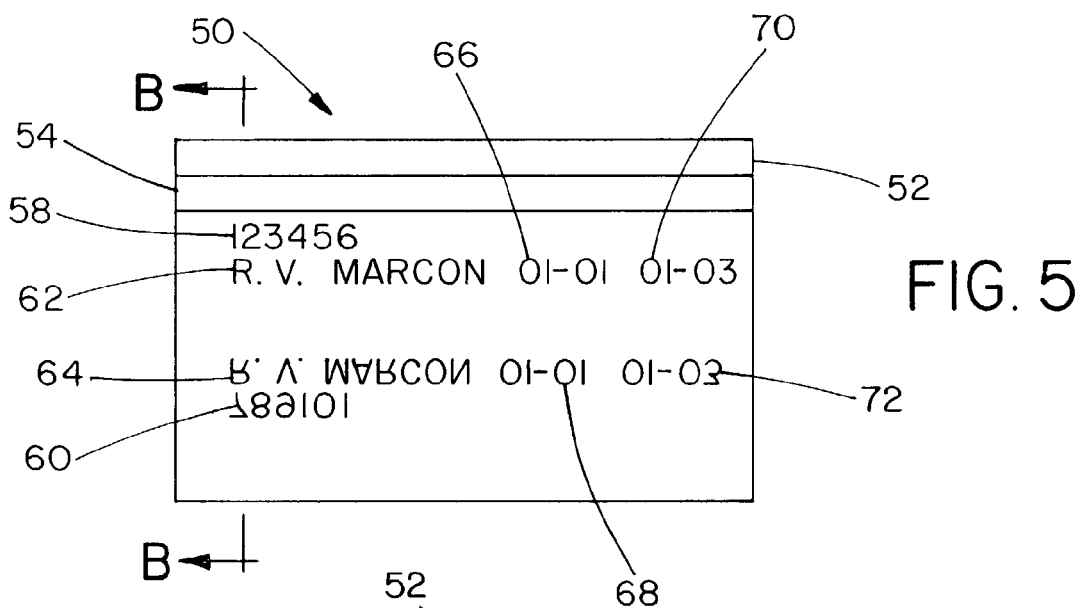
FIG. 5: is a pictorial representation of the front side of an alternate designed BMET card comprising two magnetic stripes as well as various other features.
Figure 6:
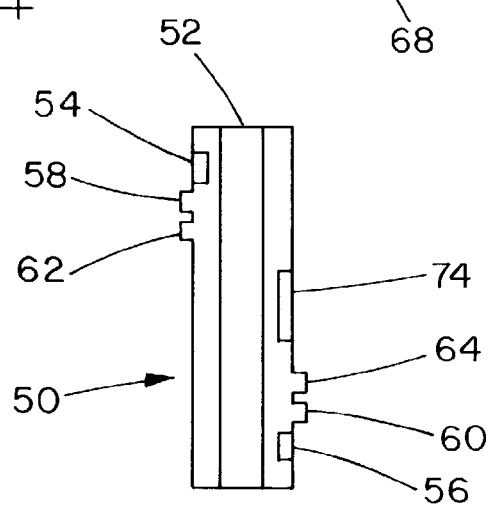
FIG. 6: is a pictorial representation of a sectional view taken substantially along line B-B in FIG. 5.

Another example of a BMET card can be seen in FIGS. 5 and 6. In this example, a BMET card 50 is comprised of a base card 52 to which has been added by conventional means, a first magnetic stripe 54, a second magnetic stripe 56, an embossed first account number 58, an embossed second account number 60, an embossed first authorized user 62, an embossed second authorized user 64, an embossed first effective date 66, an embossed second effective date 68, an embossed first expiry date 70, an embossed second expiry date 72, and a signature strip 74. Since these two magnetic stripes are not in close proximity to each other, shielding foils are generally not required in this case.

Note also, that BMET card 50, unlike BMET card 20, has not used the technique of color code matching, but rather, has utilized the technique of dedicated feature imaging. As a result, dedicated feature imaging, for the purpose of this disclosure, is herein defined as a technique which places those features that correspond, are associated or are otherwise dedicated to a particular magnetic stripe and or electronic chip in a visually upright and readable position. What this would therefore mean for BMET card 50, for example, is that account number 58, user 62, effective date 66, and expiry date 70 would be seen as visually upright relative to stripe 54 but upside down and backwards in relation to stripe 56 whereas account number 60, user 64, effective date 68, and expiry date 72 would be seen as visually upside down and backwards relative to stripe 54 but upright in relation to stripe 56.

That said, dedicated feature imaging allows most features, whether embossed or not, to be much more visually connected to their corresponding magnetic stripe and or electronic chip. That is because all unrelated features would be difficult if not impossible to read, since they would be visually seen as upside down, and at times, backwards.

Figure 7:
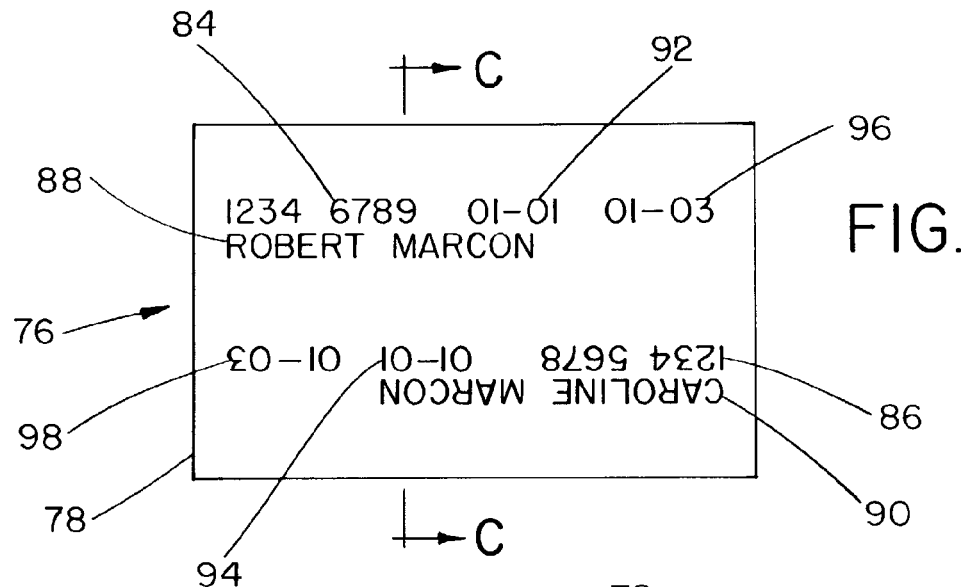
FIG. 7: is a pictorial representation of the front side of yet another alternate designed BMET card comprising two magnetic stripes as well as various other features.
Figure 8:
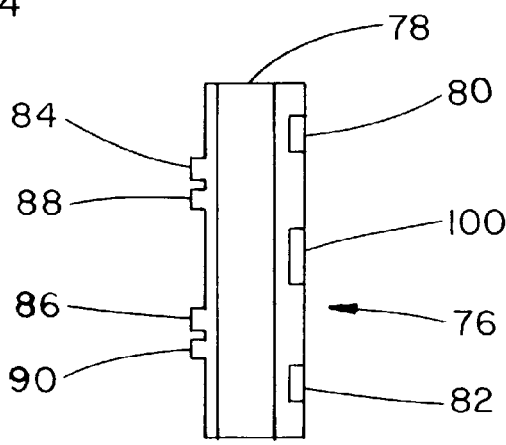
FIG. 8: is a pictorial representation of a sectional view taken substantially along line C-C in FIG. 7.
Figure 9:
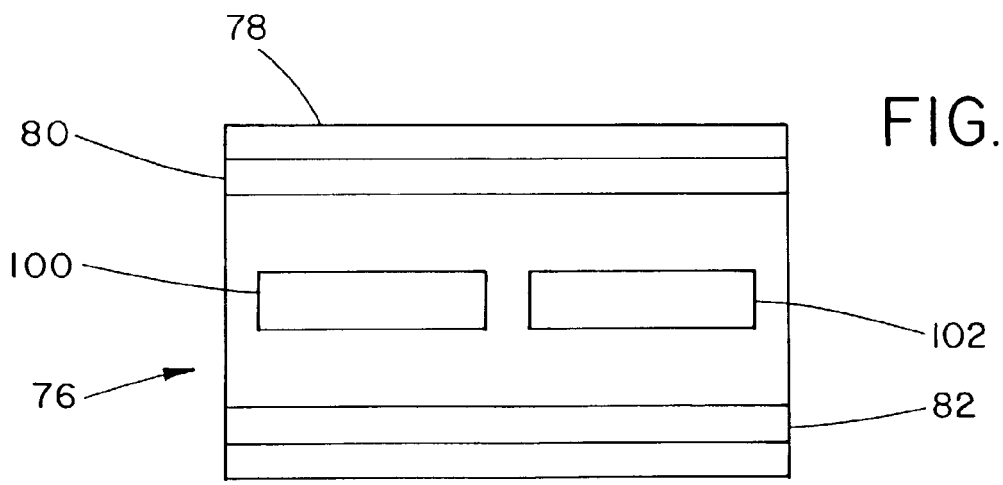
FIG. 9: is a pictorial representation of the back side of the alternate designed BMET card shown in FIG. 7.

In yet another example, a BMET card 76, as seen in FIGS. 7, 8, and 9, is comprised of a base card 78 to which has been added by conventional means, a first magnetic stripe 80, a second magnetic stripe 82, an embossed first account number 84, an embossed second account number 86, an embossed first authorized user 88, an embossed second authorized user 90, an embossed first effective date 92, an embossed second effective date 94, an embossed first expiry date 96, an embossed second expiry date 98, a first signature strip 100, and a second signature strip 102. Since magnetic stripes 80 and 82 are not in close proximity, shielding foils are generally not required in this situation either.

In addition to the above, BMET card 76 can also provide, if desired, joint signing capabilities. In this way users 88 and 90 will, by having to jointly endorse most transactions, be less likely to foolishly overspend thereby helping both problem spendthrifts and those with poor credit, get credit. For purposes of information and not limitation, joint authorizing techniques such as these are also applicable to cards possessing a single magnetic stripe and or electronic chip as well.

The disclosure, having thus detailed various BMET card designs will now proceed to describe other MET cards beginning with intermediate multi-function electronic transaction cards.

Intermediate Multi-Function Electronic Transaction Cards

Figure 10:
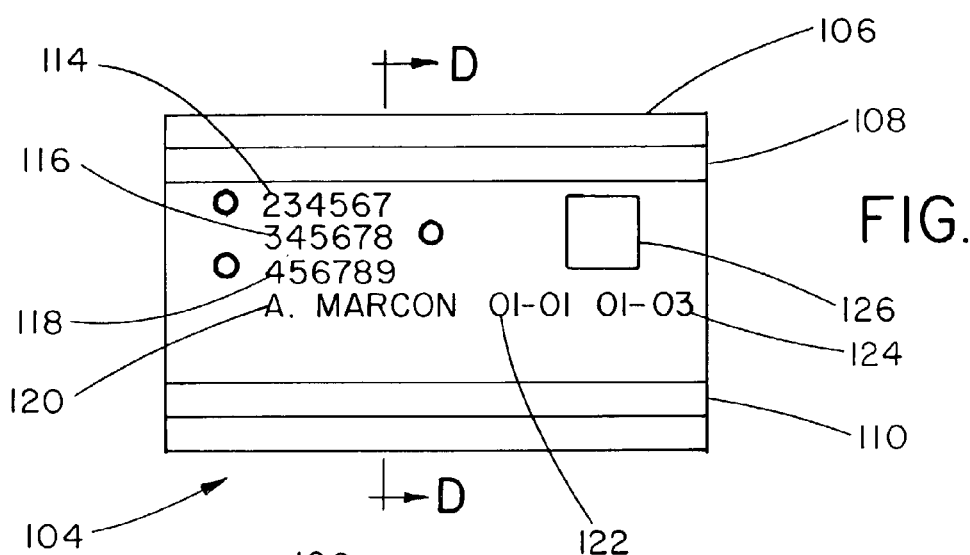
FIG. 10: is a pictorial representation of the front side of an intermediate multi-function electronic transaction card or IMET card comprising three magnetic stripes as well as various other features.
Figure 11:
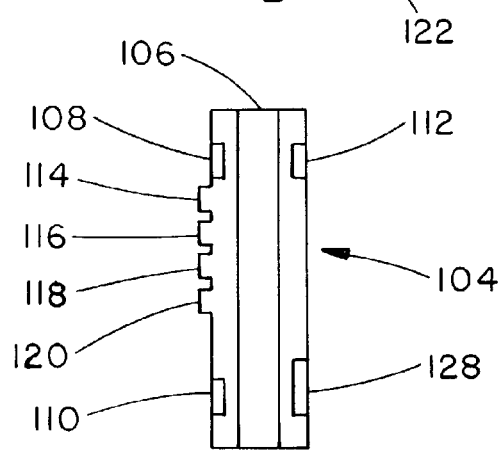
FIG. 11: is a pictorial representation of a sectional view taken substantially along line D-D in FIG. 10.
Figure 12:
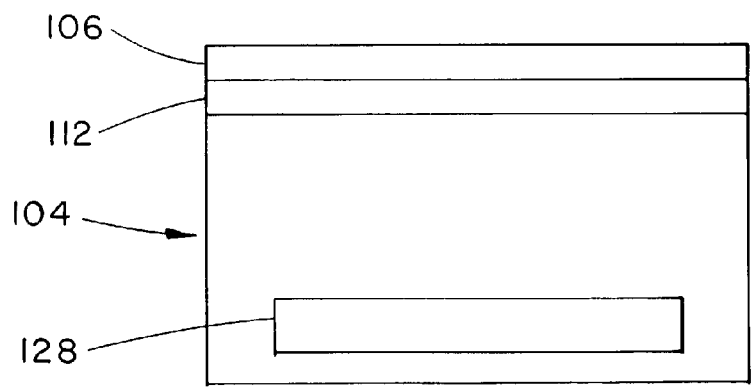
FIG. 12: is a pictorial representation of the back side of the IMET card shown in FIG. 10.

When performance needs rise yet again the employment of an additional magnetic stripe is allowed. As a result, all such designs which utilize three magnetic stripes shall be herein called intermediate multi-function electronic transaction cards or IMET cards. Thus, with this in mind, FIGS. 10, 11, and 12 display, in three corresponding views, an IMET card 104. Here, card 104 is comprised, for purposes of illustration and not limitation, of a base card 106 to which has been added by conventional means, a first magnetic stripe 108, a second magnetic stripe 110, a third magnetic stripe 112, a dotted and embossed first account number 114, a dotted and embossed second account number 116, a dotted and embossed third account number 118, an embossed authorized user 120, an embossed effective date 122, an embossed expiry date 124, a holograph 126, and a signature strip 128. If needed, shielding foils can also be used to help prevent the disruption of any magnetically encoded information found in stripes 108 and 110. This can be done in a fashion similar to that detailed above for BMET card 20 and correspondingly shown in FIG. 4.

Other variations of IMET card 104 (not shown) may include or involve the interchanging of any one of the above mentioned magnetic stripes 108, 110 or 112, with the signature strip 128. Such variations, although simple, may prove useful in certain applications.

Also of noteworthy importance, is the use of dotted and embossed account numbers by IMET card 104. These dots, located either at the beginning or at the end of certain authorized users and or account numbers can be used by vendors as check spots, in order to establish or indicate which users and or accounts are to be charged or billed. It is a simple means of identification which lowers both clerical and accounting mistakes thereby providing an increased level of convenience to all.

Advanced Multi-Function Electronic Transaction Cards

If performance requirements need to be improved further still, a fourth magnetic stripe may be utilized for such purposes. Such cards, which are herein called advanced multi-function electronic transaction cards or AMET cards, provide a very high level of performance unmatched by any conventional magnetic stripe card.

Figure 13:
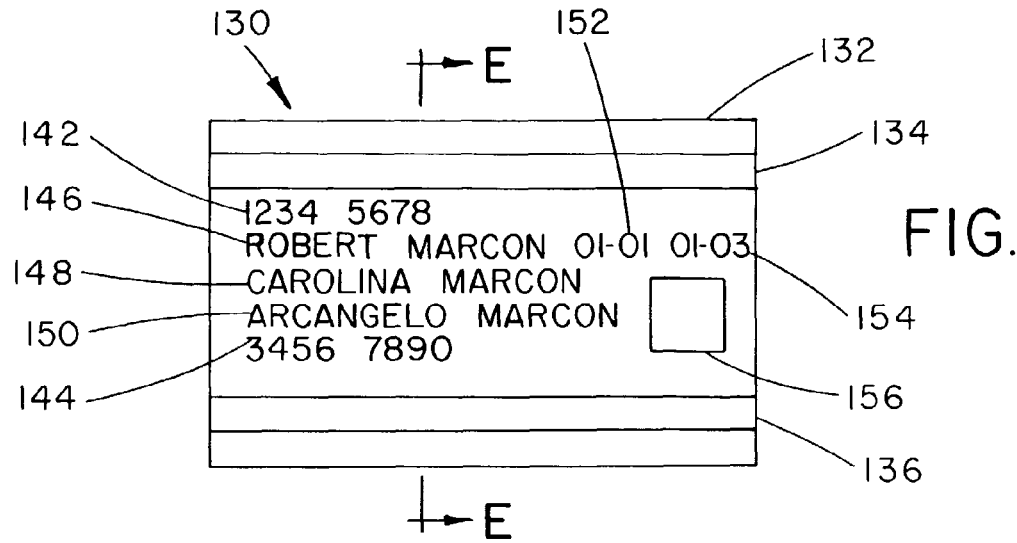
FIG. 13: is a pictorial representation of the front side of an advanced multi-function electronic transaction card or AMET card comprising four magnetic stripes as well as various other features.
Figure 14:
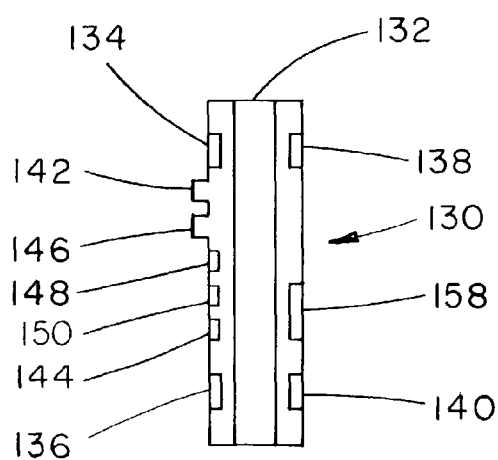
FIG. 14: is a pictorial representation of a sectional view taken substantially along line E-E in FIG. 13.
Figure 15:
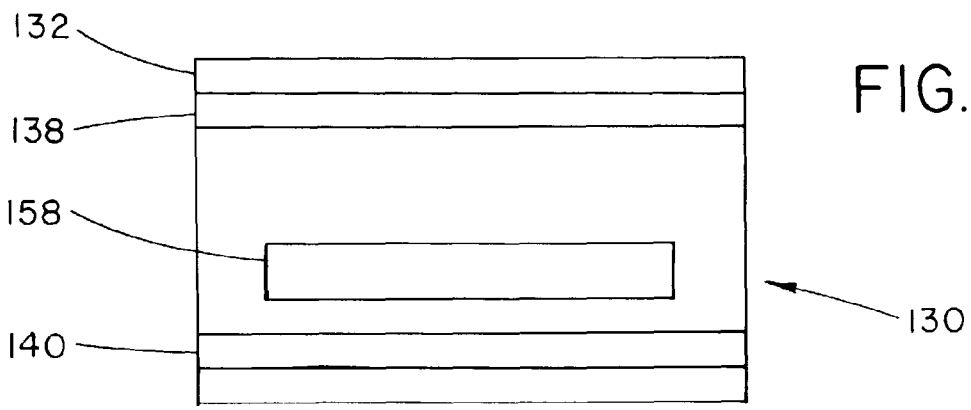
FIG. 15: is a pictorial representation of the back side of the AMET card shown in FIG. 13.

As a result, FIGS. 13, 14, and 15 show, by way of example and not limitation, various views of an AMET card 130. Here card 130, is comprised of a base card 132 to which has been added by conventional means, a first magnetic stripe 134, a second magnetic stripe 136, a third magnetic stripe 138, a fourth magnetic stripe 140, an embossed first account number 142, a second account number 144, an embossed first authorized user 146, a second authorized user 148, a third authorized user 150, an embossed effective date 152, an embossed expiry date 154, a holograph 156, and a signature strip 158. One or more shielding foils can also be used, as previously discussed, to help prevent the disruption of magnetically stored information.

In addition, magnetic stripes 138 and 140, although active and functional, do not actually display any correlating identification or account numbers. That is because criminals are much more likely to steal what they can see than what they cannot. Such a technique shall, therefore, be referred to as "ghosting" and it shall be defined as the full or partial deletion, omission or removal of some or all of the visible information normally imprinted or embossed upon a conventional or MET card in order to increase underlying standards of both privacy and security.

Note also, that only one signature strip is used in the design of AMET card 130. That is because only one authorized user, namely authorized user 146, will have full endorsing or signing authority. All others, will simply be relegated to non-signing uses which may include, but are not limited to, mail, telephone, internet and other remote purchases, deposits, bill payments, inquiries, and the like. As such, user 146, being the only unlimited authorized user, would be the only one allowed or permitted to endorse standard signature authorizing purchases, cash advances, withdrawals, monetary transfers, and other similar transactions, while the others would not.

Such an arrangement is therefore, but one example of a MET card employing both unlimited and limited authorized users. It is also an arrangement that would prove useful in many conventional single stripe, smart card, or hybrid card applications.

Enhanced Multi-Function Electronic Transaction Cards

Figure 16:
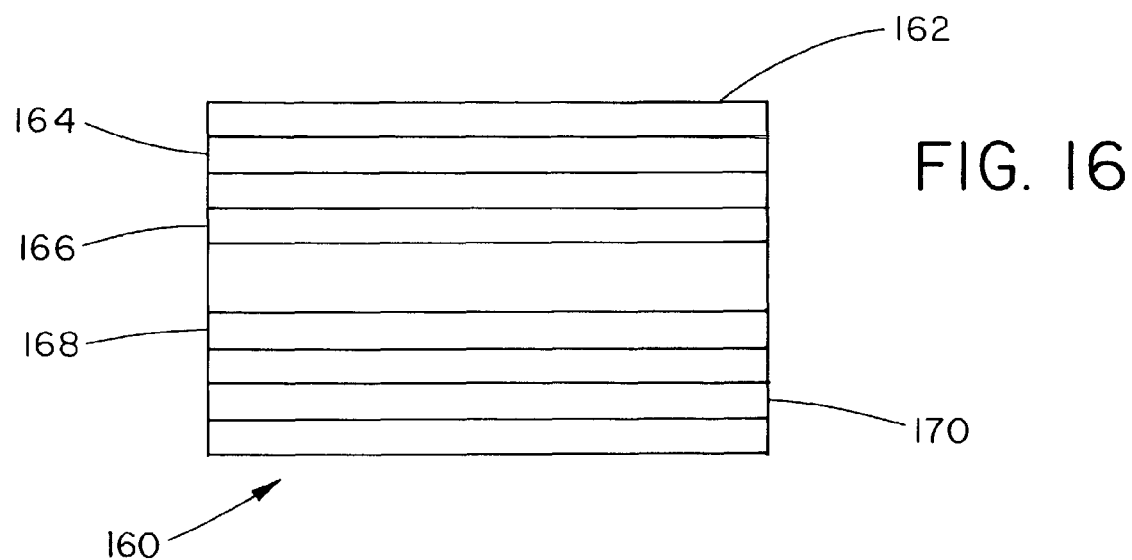
FIG. 16: is a partial pictorial representation of the back side of an enhanced multi-function electronic transaction card or EMET card that displays four of its six magnetic stripes.

When more than four magnetic stripes are used by any MET card it shall be herein referred to as an enhanced multi-function electronic transaction card or EMET card. Although many designs are possible most will be but simple extensions of existing MET card designs. For example, by paralleling another set of magnetic stripes along the inside part of existing ones, as shown in FIG. 16, a four stripe AMET card 130 can be made into a six stripe EMET card 160.

As such, EMET card 160, for purposes of illustration and not limitation, is herein comprised of a base card 162 to which has been attached or affixed, in a conventional manner, six magnetic stripes with two on the front (not shown) and four on the back (shown). The displayed stripes include a first outer magnetic stripe 164, a first inner magnetic stripe 166, a second inner magnetic stripe 168, and a second outer magnetic stripe 170. Using this concept, a MET card can easily offer as many as eight magnetic stripes by simply placing four magnetic stripes on both the front and back sides of a base card. Unfortunately, current card readers cannot read these inner magnetic stripes and so special units accommodating such designs will need to be constructed. This is, however, a disadvantage that may prove advantageous in certain situations because these new card readers would, by lacking any significant market presence, make it harder for criminals to copy and use, the information encoded on an inner magnetic stripe.

Since all outer magnetic stripes may therefore be paralleled, EMET cards may utilize anywhere from five to eight magnetic stripes. Theoretically, more than eight stripes could be used if current base cards were enlarged or the magnetic stripes themselves made narrower. However, it is felt that eight magnetic stripes should easily provide more than enough capacity to satisfy all but the most demanding market needs.

Another point of importance not previously mentioned, is the paralleling of magnetic stripes on other designs. For instance, BMET cards 20, 50, and 76 may have one or both of their respective magnetic stripes paralleled. If this were to occur, these cards would respectively possess three or four magnetic stripes. As a result, they would no longer be BMET cards but IMET or EMET cards. That is because an IMET card is herein defined as any card possessing three magnetic stripes and an EMET card as one possessing four. This simple analogy, it should be noted, is applicable throughout this disclosure but it in no way hampers the basic understandings herein taught.

Hybrid Multi-Function Electronic Transaction Cards

A hybrid multi-function electronic transaction card or HYMET card (not shown) is herein defined as any basic, intermediate, advanced or enhanced MET card to which has been added, attached or otherwise incorporated, one or more electronic chips and/or radio frequency identification tags. Unfortunately, current business opinion has concluded that smart cards, and thus by default HYMET cards, will only garner a greater market share when their costs come down and the technological as well as logistical changes necessary for their widespread use have been addressed. Until that time, magnetic stripes will remain the primary instrument of use, especially in North America.

However, while such cards may be currently unnecessary, expensive, or impractical, there may be future instances where they may prove useful. As a result, HYMET cards may be constructed by simply utilizing any number of materials, manufacturing methods or techniques already employed by many magnetic stripe and smart card manufacturers. That is because these new devices share common technological roots with existing magnetic stripe and smart card designs. As such, fabrication costs can be somewhat moderated thereby helping to encourage both consumer and corporate acceptance.

MET Card Multi-Currency Options

Current credit cards, debit cards, and other similar financial instruments have always been issued in one specific currency such as U.S. dollars, Japanese yen, or German marks. As such, their usefulness will decline as current consumer, business, and other retail requirements change in reaction to various global realities. Of course, some of these instruments will still be able to purchase various goods or services denominated in other currencies but the foreign purchase price will always be immediately converted, by the card issuer, to the card's originally assigned currency. However, cardholders may not desire such a conversion as they may wish to later pay, in the actual currency of purchase. This has, therefore, forced many cardholders to carry more than one card in order to properly address this adverse situation. It has also fostered a great desire among many cardholders for cards which possess various multi-currency credit, debit, and other payment options.

Fortunately, MET cards are perfectly suited to optimizing such situations as they will always possess at least two magnetic stripes. As such, they are able to specifically assign or commission each magnetic stripe with a different currency designation. Thus, by way of illustration and not limitation, a two stripe BMET card, could be issued in as many as two different currencies while a four stripe AMET card could be issued in as many as four. Moreover, the cards themselves could also be optimized to include credit and debit functions in order to expand their scope and usefulness. As such, a single AMET card could, for example, dedicate three of its four magnetic stripes to credit card functions that are individually denominated in U.S. dollars, Canadian dollars, and Euros, while also offering a debit card function, denominated in U.S. dollars, on the fourth and last stripe.

Since many other combinations are also possible, most issuers should therefore be able to offer a much larger array of multi-currency services. As a result, cardholders should thus be able to specifically select or choose, from a list of solicited services, those most suited or useful to their individual needs or requirements.

Such multi-currency capabilities are, therefore, not only unprecedented in their level of versatility, adaptability, and convenience but are also ideally suited to many contemporary consumer and business needs. In contrast, conventional single stripe cards are physically incapable of such tasks, and so are severely handicapped, by their technological inferiority, from addressing the international and other global needs of current cardholders.

MET Card Syndication Options

The extraordinary design versatility if MET cards, in contrast to conventional single stripe cards, allows them to be easily syndicated, i.e., wherein the issuers or business entities combine or make a joint effort to carry out specific transactions, thereby providing a number of additional marketing and business opportunities that are not only desirable but lucrative as well. Such advantages, however, are only possible because each magnetic stripe as well as electronic chip can be individually allocated to a specific issuer, thereby allowing each card the ability to represent more than one issuer. For example, a primary or main issuer may assign, sell, rent or lease in whole or in part, the rights to one or more magnetic stripes and/or electronic chips to any one or more secondary issuers. If circumstances change, these same secondary issuers may either return these rights, in whole or in part, to that same primary issuer or reassign, resell, re-rent or sub-lease, in whole or in part, their individual interests to a third party. In this way, card syndication is able to potentially offer all subscribed issuers reduced financial risk, ongoing liquidity, large reductions in both initial and operational costs as well as an increased physical presence in an overall, greater number of cards.

Closing Thoughts

The many benefits afforded by MET card designs are both innovative as well as highly marketable. Moreover, these benefits, some of which are detailed below, will not only improve performance and operational efficiencies but also reduce costs and waste as well.

(1) MET cards allow financial institutions, as well as other business entities, to offer a much larger array of services on one card. This significantly increases both customer convenience and business opportunities.

(2) The solicitation, issuing, delivering, confirmation, monitoring, and billing of conventional single stripe cards is very expensive. Consequently, when a single MET card can be used to replace a number of single stripe cards, costs are greatly reduced.

(3) Since MET cards are easily able to incorporate many different payment options into a single card, the need for checks, as a means of payment, should decrease substantially. In turn, this will not only reduce the cardholder's costs but the retailer's and issuer's as well.

(4) MET cards are easily able to provide a large number of multi-currency options specifically tailored to the individual needs of cardholders, issuers or retailers.

(5) Since any MET card design allows for at least two magnetic stripes, MET cards can be syndicated. This, therefore, allows more than one institution, company, or other business entity to be simultaneously represented on a single card, thereby dramatically lowering initial capital requirements as well as ongoing operational expenses.

(6) When MET cards are used to replace a number of conventional single stripe cards, the reduction in both bulk and weight is considerable.

(7) When a number of conventional single stripe cards are replaced with a single MET card better security features can be employed affordably. This offers both issuers and consumers alike, a higher level of protection from unauthorized or criminal use.

(8) By decreasing the overall quantity of single stripe cards, MET cards are able to significantly lower the incidence of both accidental loss and criminal theft.

(9) Worldwide, millions of single stripe cards are discarded yearly creating unnecessarily large quantities of environmental waste. By using MET cards, this tally could be dramatically reduced thereby benefiting the environment accordingly.

(10) By identically encoding at least one magnetic stripe, electronic chip or radio frequency identification tag on the same card, MET cards are able to provide immediate backup capabilities. This, therefore, not only provides a convenience currently unavailable in any other conventional card but substantially increases both reliability and dependability as well.

(11) By using at least two magnetic stripes, MET cards are able to offer performance levels unmatched by any other conventional single stripe card. As a result, the marketing and competitive potential of MET cards is not only superior but timely as well.

Addendum

Further literature on the subject of credit, debit, and smart cards, as well as other information on the materials, components, and methods herein disclosed, can be found in the many book stores, libraries, internes sites, and government publications centres currently open to the public. In addition, the following references, the entire contents of which are hereby incorporated by reference into this specification, will provide a range of detailed information which can be used to further elaborate and explain the teachings herein provided by this disclosure.
(1) U.S. Pat. No. 6,251,474 B1, Issued 26 Jun. 2001, by inventors: Yang-Ki Hong; Hong Sik Jung; and Patrick R. Taylor.
(2) U.S. Pat. No. 6,248,199 B1, Issued 19 Jun. 2001, by inventor: Joel R. Smulson.
(3) U.S. Pat. No. 5,605,753, Issued 25 Feb. 1997, by inventors: Kazutoshi Sanada; and Shigehisa Yamamoto.
(4) U.S. Pat. No. 5,466,918, Issued 14 Nov. 1995, by inventors: Lawrence A. Ray; Richard N. Ellson; and Bhavan R. Gandhi.
(5) U.S. Pat. No. 5,073,221, Issued 17 Dec. 1991, by inventors: Robert R. Waitts; and Jeffrey P. St. Thomas.
(6) U.S. Pat. No. 4,764,300, Issued 16 Aug. 1988, by inventors: Hartmut Hibst; Peter Rudolf; and Helmut Jakusch.
(7) U.S. Design Pat. D443,298 S, Issued 5 Jun. 2001.

In conclusion therefore, the reader must also understand that the preceding description contains many specificities that should not be construed as limiting the scope of the invention but as merely providing illustrations of some of the presently preferred embodiments thereof. As a result, the scope of the invention should thus be determined by the appended claims and their legal equivalents, rather than the examples given.

The invention claimed is:

1. A method of effecting allocation of an electronic transaction card to a plurality of business entities comprising the steps of:
   (a) selecting the card to comprise a base card which has incorporated therein at least two electronically readable magnetic stripes and indicia on the base card which provides information relative to each of the magnetic stripes; and
   (b) allocating and allowing control of the at least two magnetic stripes to different business entities respectively.

2. A method as recited in claim 1 wherein the step of selecting the card includes selecting the card to have the at least two magnetic stripes laminated to the base card.

3. A method as recited in claim 2 wherein the step of selecting the card includes selecting the card to have the indicia embossed to the base card.

4. A method as recited in claim 1 wherein the step of selecting the card includes selecting the card to have the indicia embossed to the base card.

5. A method as recited in claim 1 wherein the step of selecting the card includes selecting the card to have incorporated therein at least one inner electronically readable magnetic stripe and at least one outer electronically readable magnetic stripe.

6. A card as recited in claim 1 wherein the step of selecting the card includes selecting the card to have at least one electronic chip or radio frequency identification tag alone or in combination incorporated therein.

7. A card as recited in claim 1 wherein the step of selecting the card includes selecting the card to be adapted to give each of authorized users at least one endorsing power.

8. A method of effecting use of an electronic transaction card to jointly carry out transactions by a plurality of business entities comprising the steps of:
   (a) selecting the card to comprise a base card which has incorporated therein at least two electronically readable magnetic stripes; and
   (b) allocating and allowing control of the at least two magnetic stripes to different business entities respectively which are organized to use the at least two magnetic stripes to jointly carry out transactions.

9. A method as recited in claim 8 further comprising selecting the card to have indicia on the base card which provides information relative to each of the magnetic stripes.

* * * * *